United States Patent [19]
Galis

[11] 3,809,262
[45] May 7, 1974

[54] SELF-PROPELLED HAULAGE VEHICLE

[76] Inventor: Alex J. Galis, Apt. 101 Heatherbrae Square, Indiana, Pa. 15701

[22] Filed: Sept. 27, 1972

[21] Appl. No.: 292,514

Related U.S. Application Data
[62] Division of Ser. No. 189,512, Oct. 15, 1971.

[52] U.S. Cl.................................. 214/152, 214/518
[51] Int. Cl................................................ B60p 1/00
[58] Field of Search .......... 214/152, 518, 83.24, 83, 214/82, 90 R, 78, 501; 296/26

[56] References Cited
UNITED STATES PATENTS

| | | | |
|---|---|---|---|
| 3,273,732 | 9/1966 | Trieschmann................ | 214/90 R X |
| 3,197,048 | 7/1965 | Hayes.............................. | 214/78 |
| 3,054,160 | 9/1962 | Tourneau...................... | 214/83.24 X |
| 3,326,396 | 6/1967 | Kersey et al................. | 214/83.24 X |

Primary Examiner—Albert J. Makay
Attorney, Agent, or Firm—Stanley J. Price, Jr.

[57] ABSTRACT

An improved, self-propelled haulage vehicle, for hauling loose mined material, such as coal, in an underground mine or the like. The haulage vehicle comprises prime mover means operably connected to a trailer having a material haulage-compartment that includes a fixed, or stationary, hopper portion having mounted therewith one or more selectively movable hopper portions whereby the effective length, and hence hauling capacity, of the haulage vehicle may be varied, and whereby rapid loading and unloading of the vehicle is obtained. In one embodiment, the trailer means includes a fixed hopper portion having mounted thereon front and rear movable hopper portions which may be selectively positioned during loading and unloading of the haulage vehicle. Each of the hopper portions is channel-shaped and includes spaced-apart vertical sidewalls transversely interconnected by a bottom plate portion. The movable front hopper includes pivotally mounted at the end thereof a loading and holding gate means adapted to pivot to an open position during vehicle loading or unloading and to a closed position during loaded vehicle travel. Further provided is a cleaner plate within the trailer means adapted to travel the length of the fixed hopper portion whereby the hopper contents may be dumped, or discharged therefrom.

8 Claims, 16 Drawing Figures

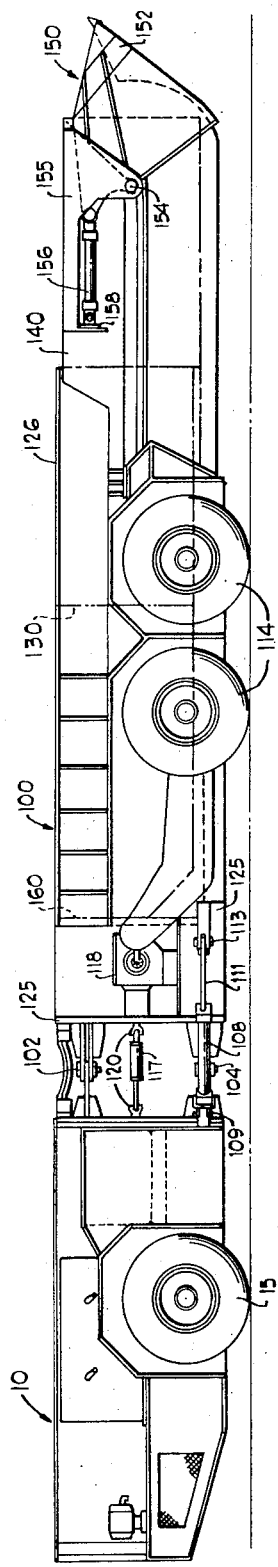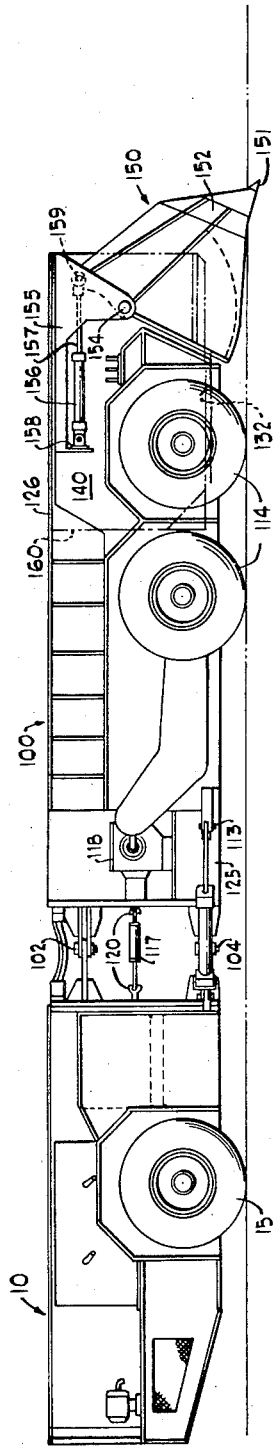

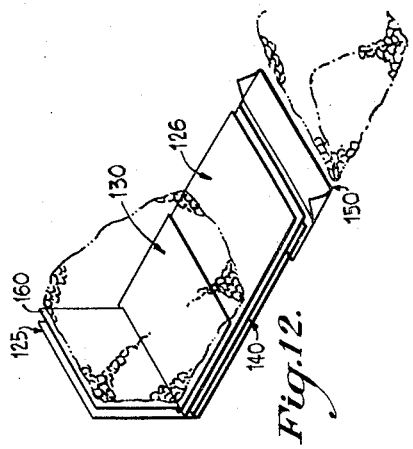
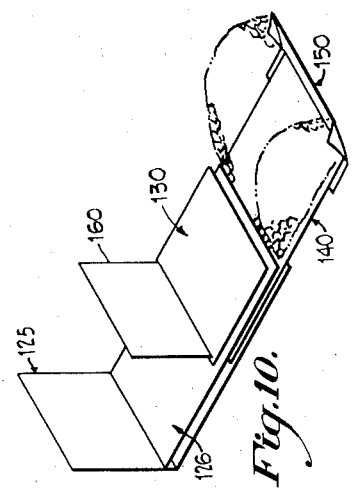
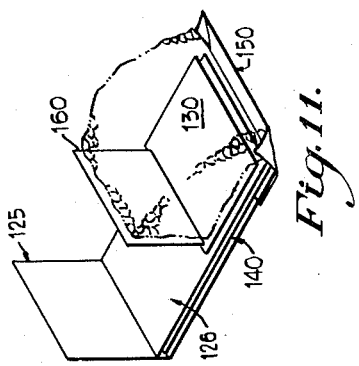
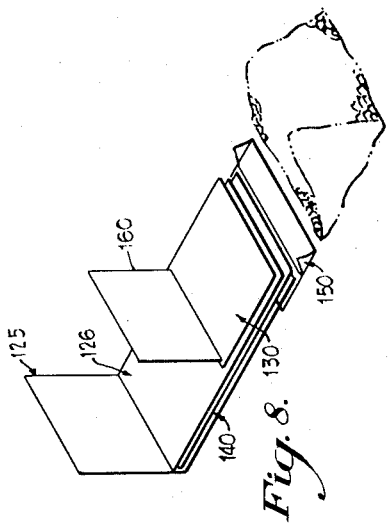
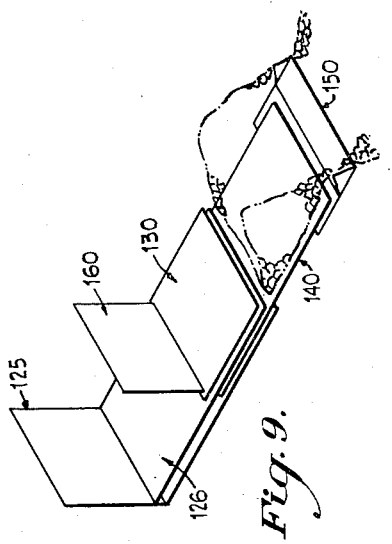

SELF-PROPELLED HAULAGE VEHICLE

CROSS-REFERENCE TO RELATED APPLICATIONS

This application is a division of United States patent application Ser. No. 189,512, filed Oct. 15, 1971, entitled "IMPROVED SELF-PROPELLED HAULAGE VEHICLE."

BACKGROUND OF THE INVENTION

1. Field of the Invention

This invention relates to a haulage vehicle for hauling loose material in an underground mine, and more particularly to a self-propelled haulage vehicle having a hopper portion of varying length and capacity and methods for loading and unloading loose material.

2. Description of the Prior Art

The conventional shuttle car for hauling loose material in underground mines has a rigid body with a material haulage compartment extending lengthwise thereof. A typical shuttle car is described in U.S. Pat. No. 2,457,569. Such shuttle cars generally have the function of carrying loose materials, such as coal, between a loading station at which it is loaded and a main haulage conveyor, or train of mine cars, into which it discharges its contents. In loading conventional shuttle cars, such as those described in the foregoing patent, a conveyor-type loader is generally provided. A typical loading station may include a continuous mining machine with a rearwardly extending conveyor that discharges coal into the shuttle car haulage compartment. In other instances the coal dislodged by the mining operation is gathered by a conventional loading machine and loaded into the shuttle car. The shuttle car haulage compartment ordinarily includes an endless conveyor in its bed portion. For discharging the shuttle car's contents, the conveyor, usually including a pivotable discharge boom, is activated for conveying the dislodged material in the haulage compartment. Another shuttle car is described in Canadian Pat. No. 852,631 wherein a conveyor-containing shuttle car has a flexible body and maintains traction while traveling over uneven surfaces.

U.S. Pat. No. 3,306,478 discloses a self-loading shuttle car which includes a front-mounted scoop for first picking up a rather small quantity of ore, or the like, and thereafter depositing the scooped-up ore in a rearwardly located load box. There, the scoop may additionally be employed for pushing the load from the vehicle. Another scoop-containing shuttle car is disclosed in U.S. Pat. No. 3,226,857 where a tiltable scoop is mounted forwardly of a wheeled vehicle. That shuttle car contains no load box and its capacity is limited to the capacity of its scoop.

This invention provides a compact, yet high capacity, haulage vehicle. Additionally, the invention provides a haulage vehicle, such as a shuttle car, capable of rapid and efficient loading and unloading. Moreover, the invention provides a haulage vehicle which may be loaded and unloaded without the use of a conveyor. Specifically, the invention provides a haulage vehicle which may be unloaded without the use of a self-contained conveyor means, and which may load dislodged material on the mine floor without the use of a separate loading machine. The invention provides for a significant reduction in the equipment at a loading station, and is capable of loading a pile of loose mining material without the use of auxiliary loading equipment.

Other advantages and details of the invention will become apparent as this specification proceeds.

SUMMARY OF THE INVENTION

This invention provides an improved haulage vehicle, such as a shuttle car or the like for transporting loose mined materials. The haulage vehicle includes prime mover means having hopper or trailer means operably connected thereto. Preferably, both prime mover means and trailer means are wheeled vehicles. The prime mover means includes power means for driving the haulage vehicle to selected positions and preferably is pivotally connected to the trailer means whereby pivoting of the prime mover means about the pivot connection steers the haulage vehicle. It is further preferred that the wheels on the trailer means are powered wheels, and are driven by power means provided on the prime mover means through appropriate power transmission connections therewith.

The trailer means includes a fixed, or stationary, hopper portion and further includes one or more selectively movable hopper portions whereby the effective length, and hence hauling capacity, of the hauling vehicle may be varied, and whereby the haulage vehicle may be rapidly and efficiently loaded and unloaded. In a preferred embodiment, the trailer means includes a fixed hopper portion, having operably mounted thereon front and rear selectively movable hopper portions. The front and rear hopper portions may be selectively positioned during loading and unloading of the haulage vehicle. Each of the hopper sections is preferably channel-shaped and includes spaced-apart vertical sidewalls transversely interconnected by a bottom plate portion. The movable front hopper portion preferably includes a loading and holding gate operably connected thereto. The loading and holding gate is pivotally mounted at the end thereof and adapted to pivot to an open position during vehicle loading or unloading, and to a closed position when the loaded vehicle is moving from a loading station to a discharge station. The loading and holding gate includes a digging blade portion extending from the shuttle car and adapted to pass under a pile, or mass, of loose mined material such as coal to facilitate loading of the material into the hopper portions.

Further provided is a movable cleaner plate means adapted to travel the length of the fixed hopper portion whereby the vehicle contents may be discharged, or unloaded, therefrom. Power for moving the movable cleaner plate is provided by means of fluid-actuated piston cylinder assemblies operably connected thereto through piston rods. It is further preferred that each of the movable hopper portions, and the pivotally mounted loading and hauling gate are likewise powered by means of fluid-actuated piston cylinder assemblies through appropriate interconnections therewith.

Other advantages and details of the invention will become apparent by reference to the appended drawings and as the following more detailed description thereof proceeds.

BRIEF DESCRIPTION OF THE DRAWINGS

FIG. 2 is a side elevation of the haulage vehicle of FIG. 1 in an extended or fully-loaded position.

FIG. 3 is a partial side elevation of the haulage vehicle of FIG. 1 in initial retracted, or ready-to-load, position.

FIGS. 8–16 are schematic Figures illustrating a method of loading the vehicle by sequentially advancing the extendable trailer means into a pile of dislodged material.

DESCRIPTION OF THE PREFERRED EMBODIMENTS

Figure 1:
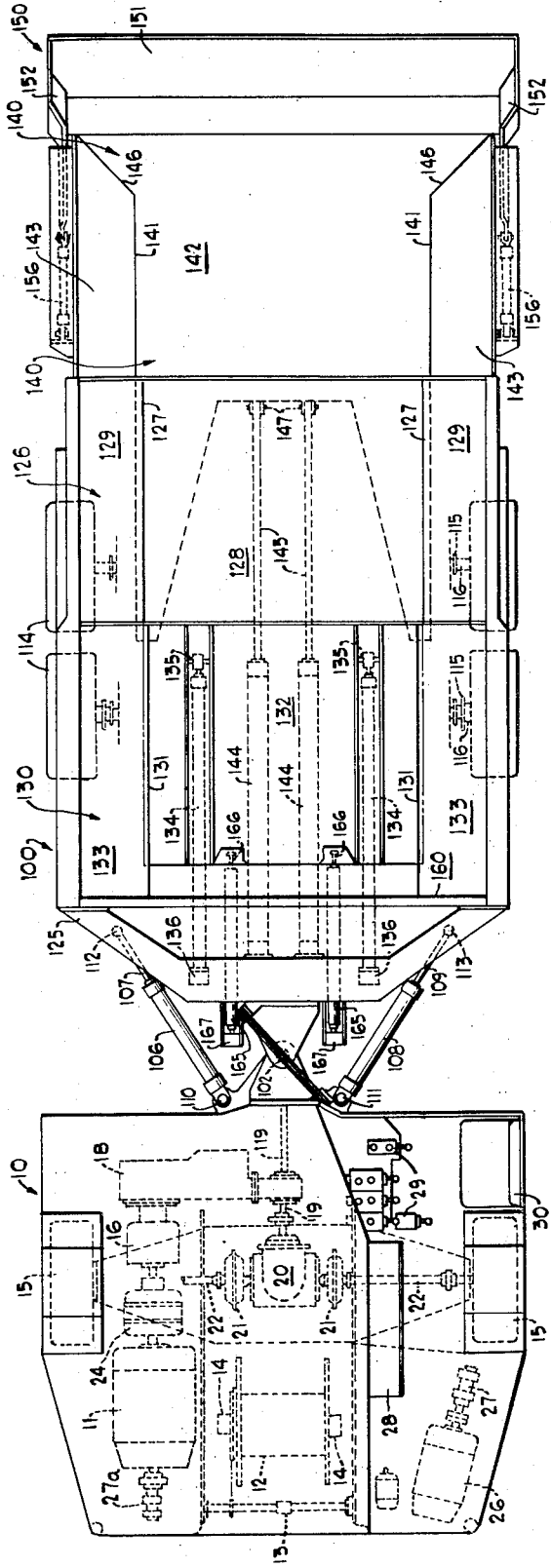
FIG. 1 is a top plan view of a haulage vehicle according to the invention.

Referring now to FIG. 1, a haulage vehicle according to the invention is shown in top plan and includes a prime mover portion 10 operably connected to trailer or hopper portion 100. Prime mover 10 generally comprises a power and control station for the haulage vehicle and has mounted thereon a main power source, such as electric motor 11. Electrical power is supplied to motor 11 through an electrical cable (not shown) wound upon a cable reel 12 through a spooling, or level-winding device 13. Cable reel 12 may be mounted upon prime mover 10 in a conventional fashion as by mounting upon an axle (not shown) journaled in spaced-apart structural members 14. Motor 11 is operably connected to drive wheels 15 for prime mover 10. In FIG. 1, motor 11 is connected to drive wheels 15 through clutch 16 connected to an input shaft of a transmission 18 which is, in turn, operably connected to a differential 20 through an appropriate drive shaft 19. The differential 20 has output shafts connected to driving axles 22 upon which wheels 15 are mounted. Brake devices 21 are provided on the respective driving axles 22. A suitable coupling, or gear reducer, 24 is disposed in the drive train between motor 11 and clutch 16.

Additionally provided on prime mover 10 is an auxiliary motor 26. It may be noted here that each of the various motors, transmission, clutch, etc. may be mounted upon prime mover 10 in conventional fashion, as by mounting upon transverse beams or plates in the structure of prime mover 10. It is preferred that the various electric motors, and the like, be housed in somewhat enclosed fashion for reducing or eliminating dirt and dust from reaching the various components.

Prime mover 10 is operably connected to trailer portion 100 in a fashion whereby the haulage vehicle may be driven and steered. In the Figures prime mover 10 is pivotally connected to trailer portion 100 through a pair of vertically spaced-apart pivot connections 102 and 104. A pair of cylinders 106 and 108 are provided for rotating prime mover 10 about pivot connections 102 and 104 whereby the haulage vehicle shown may be steered. Each of the cylinders 106 and 108 includes rods 107 and 109, respectively, and together span between prime mover 10 and trailer portion 100. Each cylinder and rod is pivotally connected to both trailer and prime mover. To that end, pivot pins 110 and 111 are provided for connecting cylinders 106 and 108 respectively to prime mover 10. Additionally, rods 107 and 109 are pivotally connected to trailer 100 by pivot pins 112 and 113, respectively. Each of the cylinders 106 and 108 is preferably a fluid-actuated piston cylinder assembly and each is functionally a "steering" cylinder. For example, activation of cylinder 106 will cause rod 107 to extend from cylinder 106 in a fashion whereby the haulage vehicle shown may be steered to the left, and conversely, activation of cylinder 108 may extend rod 109 and steer the shuttle car to the right.

Trailer portion 100, like prime mover 10, is a wheeled vehicle and includes pairs of wheels 114. Wheels 114 are preferably driven wheels driven by means of chains or the like (not shown) passing over sprockets 115 on wheel axles 116 and over an appropriate drive means therefor. A differential 118 is provided upon trailer 100 for transmitting power to the chain driven wheels. Differential 118 is coupled to wheels 114 is conventional fashion and may include a pair of outwardly extending shafts including appropriate sprockets for driving wheels 114. Differential 118 is coupled to the main power source for the shuttle car through a drive train including shaft 119 coupled through universal joints 120 into transmission 18 mounted on prime mover 10. The shaft 119 has a telescopic portion 117 to compensate for changes in length due to pivoting between prime mover 10 and the trailer 100.

Trailer 100 includes a fixed frame 125 having a fixed, or stationary hopper 126 mounted thereon. Stationary hopper 126 comprises a generally channel-shaped hopper having spaced-apart vertically extending sidewalls 127 transversely interconnected by bottom plate portion 128. In addition, fixed hopper portion 126 includes outwardly flared sidewall portions 129 extending outwardly and upwardly from the tops of respective sidewalls 127.

A rear, movable hopper portion 130 is provided on trailer 100 having a pair of vertically extending spaced-apart sidewalls 131 transversely interconnected by bottom plate portion 132. In addition, outwardly flared sidewall portions 133 are provided whereby a channel-shaped rear hopper portion is formed having similar cross section to that of stationary hopper portion 126 of trailer 100. Rear hopper portion 130 is adapted to move reciprocally longitudinally of trailer 100. To that end means are provided for reciprocally moving rear hopper portion 130 with respect to stationary hopper portion 126. Preferably, the means for so moving rear hopper portion 130 comprise a pair of fluid-actuated piston cylinder assemblies 134 operably attached to rear hopper portion 130. Cylinders 134 may be operably attached to rear hopper portion 130 in conventional fashion, as by pinning or bolting piston rods 135 therein to the underside of rear hopper 130, and rigidly affixing, as by bolting or pinning, the respective rear cylinder portions 136 thereof to stationary frame 125 of trailer 100. In this manner activation of the piston cylinder assemblies 134, as by altering the fluid pressure therein through appropriate control means (more fully descibed hereafter) the respective piston rods 135 are extended or retracted relative to cylinders 136 whereby rear hopper 130 may move reciprocally longitudinally in trailer 100 over the bottom plate 128 of stationary hopper 126. The sidewalls 131 of rear hopper 130 are positioned inboard of sidewalls 127 of hopper 126 and are movable longitudinally relative thereto. Rear hopper portion 130 is adapted to move rearwardly of the trailer 100 at least a distance equal to the length of stationary hopper portion 126 whereby the rearward edge thereof may reach the rearward edge of stationary hopper 126.

Further included in the haulage vehicle is a movable front hopper portion 140 including vertically extending sidewalls 141 transversely interconnected by a bottom plate portion 142. As with movable rear hopper portion 130, movable front hopper portion 140 includes outwardly flared sidewall portion 143 extending vertically away from the tops of the respective sidewalls 141 whereby movable front hopper portion 140 has a channel-shaped cross section similar to that of stationary hopper portion 126. The front hopper portion 140 has the bottom plate 142 positioned below the bottom plate 128 of fixed hopper 126 and is arranged to move longitudinally relative thereto, similarly the upwardly extending sidewalls 141 are outboard of sidewalls 127 of fixed hopper 126. Preferably, fluid-actuated piston cylinder assemblies 144 including piston rods 145 are operably connected to front hopper portion 140 for moving front hopper 140 relative to fixed hopper 126. As with piston cylinder assemblies 134 for moving rear hopper portion 130, piston cylinder assemblies 144 are rigidly affixed to stationary frame 125 of trailer 100 at the rear of the assemblies 144 while piston rods 145 are affixed to front hopper portion 140, as by pinned connections 147, so that fluid under pressure to piston cylinder assemblies 144 may extend or retract piston rods 145 from their respective cylinders for imparting movement to front hopper portion 140 relative to stationary hopper portion 126.

Thus, the respective stationary, front and rear hopper portions are provided in substantially overlying, slidable relationship. For example, rear movable hopper portion 130 moves over the top of stationary hopper portion 126 while front movable hopper portion 140 moves under main stationary hopper portion 126.

Movable front hopper portion 140 has mounted thereon for movement therewith a loading and holding gate means 150 including a blade portion 151. Blade portion 151 interconnects inwardly converging sidewall portions 152 for aiding in rapidly loading and unloading the shuttle car according to the invention, as will be more fully described hereinafter. Loading and holding gate 150 is pivotally mounted upon front movable hopper portion 140 and is adapted to pivot to an open position during shuttle car loading or unloading, and to a closed position during loaded vehicle travel. To that end, loading gate 150 is pivotally connected, by pins 154 in plates 155 rigidly affixed to front hopper portion 140. Means are provided for rotating, or pivoting, the gate 150 about pins 154. Preferably, the pivot means includes a fluid-actuated piston cylinder assembly 156 including piston rods 157 therein. The rear portion 158 of assembly 156 is pivotally affixed, as by pinning or bolting, to an appropriate mount therefor on plate 155 while a rod 157 is pivotally affixed at 159 near the uppermost (as shown) portion of loading and holding gate 150. With this arrangement fluid under pressure supplied to piston cylinder assembly 156 extends and retracts piston rods 157 to thereby pivot loading and holding gate 150 about pins 154. Thus, loading and holding gate 150 may be rotated from its loading and unloading position (FIG. 3) to its holding or closed position (FIG. 2).

A movable plate means 160 is provided operably mounted upon rear movable hopper 130. Sliding plate 160 is adapted to move reciprocally the length of rear hopper portion 130. Slidable plate 160 has a dual function, namely, in one instance plate 160 may form the rear wall of rear hopper portion 130, and additionally may serve as a cleaner plate for discharging materials within trailer 100. Means are provided for slidably moving plate 160 reciprocally the length of rear hopper portion 130. Preferred such means comprise a pair of fluid-actuated piston cylinder assemblies 165 including piston rods 166 therein operably fixedly connected to plate 160. Cylinder assemblies 165 are mounted upon respective channel-shaped mounts 167 therefor, which mounts are in turn rigidly attached to rear hopper portion 130 whereby mounts 167 and cylinders 165 may travel conjointly with movable rear hopper portion 130 in its reciprocal longitudinal travel within trailer 100.

Activation of cylinder assemblies 165, extend and retract rods 166 fixedly attached to slidable plate 160 whereby plate 160 may advance and retract over rear hopper portion 130.

It should be noted here that fluid may be supplied to the various fluid-actuated piston cylinder assemblies on the shuttle car in a conventional fashion. Preferably auxiliary motor 26 on prime mover 10 is employed for operating fluid pump means 27 for supplying fluid under pressure to the various cylinders. In addition an auxiliary pump means 27a is provided operated by primary power source, motor 11 on prime mover 10. Pump means 27 may pump fluid, such as hydraulic oil, from a tank (not shown) located on prime mover 10 to the various piston cylinder assemblies. Suitable valving means and controls therefor for supplying fluid at a desired pressure to selected cylinders is provided on the prime mover at a control station 28 by various controls 29 on a control panel which may include both electrical controls and hydraulic controls. An operator station 30 is additionally provided whereby the shuttle car operator has convenient access to the various controls.

Figure 15:
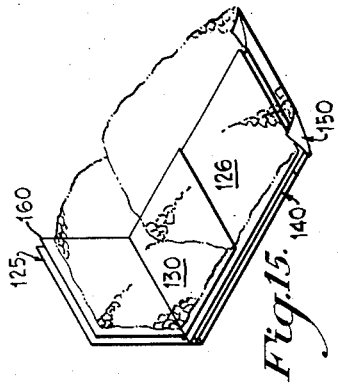
Figure 16:
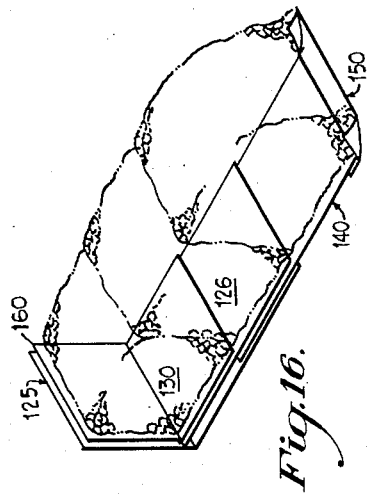
Figure 13:
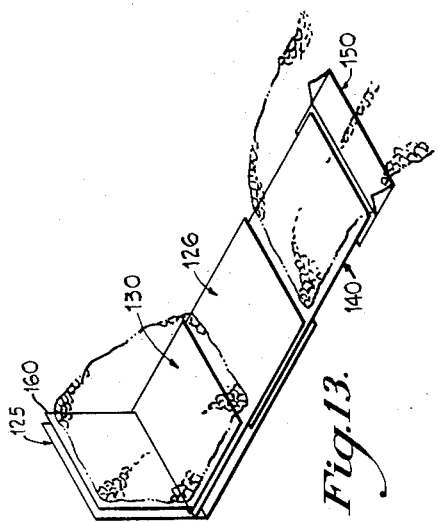
Figure 14:
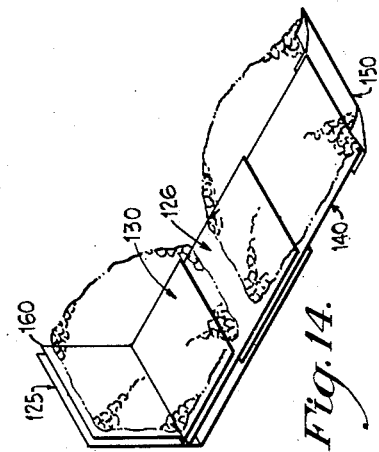

In operation, the haulage vehicle may be efficiently loaded with loosely mined materials, such as coal or ore, as is schematically illustrated in FIGS. 8-16. The motor 11 on prime mover 10 is activated for driving the haulage vehicle and the front hopper is in a retracted position as illustrated in FIG. 3, and the rear hopper 130 is advanced on fixed hopper 126 with gate 160 also advanced. The gate 150 is lowered. While the vehicle remains stationary the front hopper 140 is advanced into a pile or mound of coal. (FIG. 9) Thereafter, the gate 150 is closed (FIG. 10) and the front hopper 140 is retracted to deposit the load in front hopper 140 on rear hopper 130. The rear hopper 130 is then retracted on fixed hopper 126 (FIG. 12). If sufficient coal remains in the pile, the vehicle may remain stationary and the front hopper 140 again extended with the gate 150 down to move under the pile and again fill front hopper 140 (FIG. 13). If the pile of coal is depleted for another load at that location, the vehicle may be advanced toward the pile before the front hopper 140 is again extended. After the front hopper 140 is filled by advancing into the pile, the gate 150 is closed (FIG. 14) and the hopper 140 is retracted to transfer the coal to the fixed hopper 126 (FIG. 15). To complete loading the vehicle, the front hopper 140 is again advanced into the pile with the gate down to fill front hopper 140. The gate 150 is thereafter closed and the filled haulage vehicle is ready to transport the load to a discharge station.

Figure 4:
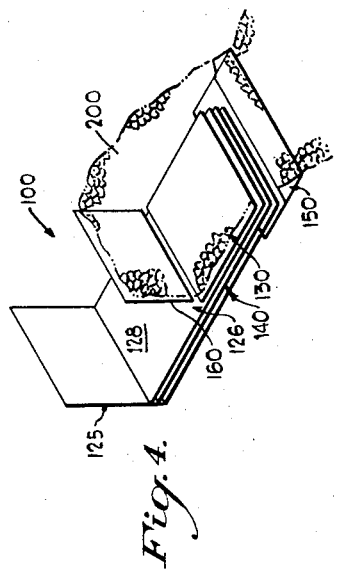
Figure 5:
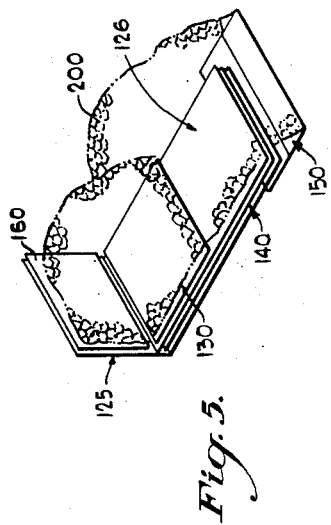

Another method of loading the vehicle is to use the tractive force of the vehicle to move the trailer into a pile of coal. The haulage vehicle is advanced with the trailer components in the position shown in FIG. 3, i.e., with front hopper portion 140 in retracted position, rear hopper portion 130 in advanced position having sliding plate 160 located rearwardly thereof, and loading and holding gate 150 in open position. The haulage vehicle is forcibly driven into the pile of coal. In that fashion blade 151 on gate 150 is forced into the coal thereby urging it into the haulage vehicle in cooperation with inwardly converging sidewalls 152. Advancing the vehicle into the mined material is continued until rear hopper portion 130 is completely filled. At this point trailer portion 100 is filled as schematically illustrated in FIG. 4 with respective rear, stationary and front hopper portions designated generally 130, 126 and 140, and main frame portion generally 125. There, rear hopper 130 includes a partial load of coal, or mined material, 200. Thereafter cylinders 134 are activated whereby rear hopper portion 130 and sliding plate 160 are withdrawn to their forwardmost position in trailer 100 (FIG. 1). That initial loading operation having been completed, there remains an open or unloaded hopper defined by stationary hopper 126. Vehicle traction is continued whereby the vehicle may back further into the pile of mined materials for filling that open portion (FIG. 5). Thereafter power to the various vehicle wheels is discontinued and brakes, such as dual caliper brakes 21 are applied to maintain the vehicle in unmoving position. Cylinders 144 are next activiated for forcibly advancing front hopper portion 140 having open gate 150 thereon into the pile of coal. It may be here noted that front hopper portion preferably includes forwardly located inwardly converging side wall portions to aid in the flow of coal into hopper 140. After rods 145 in cylinders 144 have been fully extended, gate 150 is rotated to closed position by gate cylinders 156 and the trailer 100 is filled. Where desired, the front hopper may be extended and the vehicle moved into the coal pile by the propelling means to fill the front hopper 140.

Figure 6:
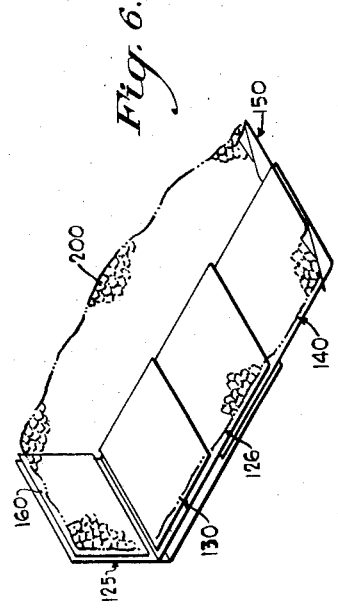
FIGS. 4–7 are schematic Figures illustrating the progressive loading and unloading of the vehicle trailer means including fixed and movable hopper portions according to the invention.

FIG. 6 schematically illustrates the thus fully loaded trailer portion. As shown there, the trailer is extended to its full length, completely filled with mined material 200. As the same time, gate 150 is withdrawn to closed, or holding, position.

Figure 7:
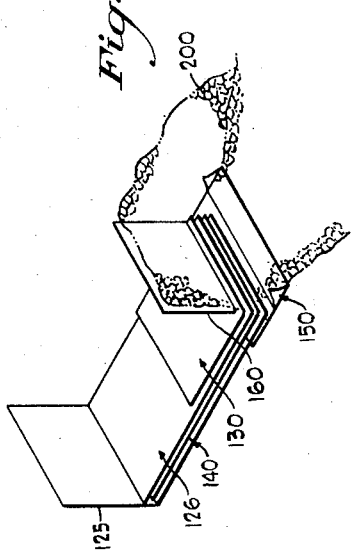

With reference now to FIG. 7, unloading of the vehicle is schematically illustrated. The initial unloading step comprises rotating holding gate 150 to open position for dumping the mined material held in position by the closed gate. Thereafter, movable front hopper portion 140 may be retracted with gate 150 in open position for discharging its retained material. Thereafter rear hopper portion 130 and sliding plate 160 are advanced whereby the coal or material in stationary hopper 126 is forced from the shuttle car. Finally, as shown in FIG. 7, sliding plate 160 is advanced the length of rear hopper portion 130 for forcing the remaining material from the hopper car. Thereafter the respective components may be returned to their positions as indicated in FIG. 4 and returned to the mined materials site for repeating loading and unloading process.

According to the provisions of the Patent Statutes, the principal, preferred construction and mode of operation of the invention have been explained and described as have what is now considered to represent its best embodiments. It should be expressly understood, however, that the invention is not necessarily limited to the particular embodiments disclosed therein, but may be variously practiced within the scope of the following claims.

I claim:
1. A method for loading a haulage vehicle comprising,
   moving the material haulage portion of said vehicle to a location adjacent a pile of particulate material,
   lowering a loading gate pivotally secured to a first hopper portion to a level adjacent the base of said pile of particulate material,
   advancing said loading gate and a first hopper portion into said pile of particulate material while maintaining a second hopper portion stationary to fill said first hopper portion with said particulate material from said pile,
   retracting said loading gate and said first hopper portion and transferring said particulate material in said first hopper portion into said second hopper portion to load said second hopper portion,
   thereafter advancing said loading gate and said first hopper portion into said pile of particulate material to fill said first hopper portion,
   advancing said second hopper portion forwardly on a third hopper portion prior to loading of said second hopper portion from said first hopper portion, and
   retracting said second hopper portion on said third hopper portion after said particulate material in said first hopper portion is transferred to said second hopper portion.

2. A method for loading a haulage vehicle as set forth in claim 1 which includes,
   again advancing said loading gate and said first hopper portion into said pile of particulate material to again fill said first hopper portion with particulate material,
   retracting said first hopper portion and transferring said particulate material in said first hopper portion to said third hopper portion.

3. A method for loading a haulage vehicle as set forth in claim 2 which includes,
   thereafter advancing said first hopper portion into said pile of particulate material to fill said first hopper portion so that said vehicle first, second and third hopper portions are filled with said particulate material.

4. A method for loading a haulage vehicle comprising,
   lowering a loading gate pivotally secured to one of said hopper portions on said haulage vehicle,
   advancing a second hopper portion forwardly on a first fixed hopper portion,
   moving said vehicle into a pile of particulate material with said loading gate lowered and filling said second hopper portion,
   thereafter retracting said filled second hopper portion on said fixed first hopper portion,
   moving said vehicle into said pile of particulate material with said loading gate lowered to fill said fixed first hopper portion,
   advancing a third hopper portion forwardly relative to said fixed first hopper portion, and moving said vehicle into said pile of particulate material with said loading gate lowered and filling said third hopper portion.

5. A method for loading a haulage vehicle comprising, moving the material haulage portion of said vehicle to a location adjacent a pile of particulate material, advancing a second hopper portion forwardly on a third hopper portion, advancing a first hopper portion into said pile of particulate material while maintaining said second hopper portion stationary to fill said first hopper portion with said particulate material from said pile, retracting said first hopper portion and transferring said particulate material in said first hopper portion into said second hopper portion to load said second hopper portion, retracting said second hopper portion on said third hopper portion after said particulate material in said first hopper portion is transferred to said second hopper portion, thereafter advancing said first hopper portion into said pile of particulate material to fill said first hopper portion, and retracting said first hopper portion and transferring said particulate material in said first hopper portion to said third hopper portion.

6. A method for loading a haulage vehicle as set forth in claim 5 which includes, thereafter advancing said first hopper portion into said pile of particulate material to fill said first hopper portion so that said vehicle first, second and third hopper portions are filled with said particulate material.

7. A method for loading a haulage vehicle comprising, advancing a second hopper portion forwardly on a first fixed hopper portion, moving said vehicle into a pile of particulate material and filling said second hopper portion, thereafter retracting said filled second hopper portion on said first fixed hopper portion, moving said vehicle into said pile of particulate material to fill said fixed first hopper portion, advancing a third hopper portion forwardly relative to said fixed hopper portion, and moving said vehicle into said pile of particulate material and filling said third hopper portion.

8. A method for loading a haulage vehicle comprising, advancing a second hopper portion forwardly on a first fixed hopper portion, moving said vehicle into a pile of particulate material and filling said second hopper portion, thereafter retracting said filled second hopper portion on said fixed first hopper portion, moving said vehicle into said pile of particulate material to fill said fixed hopper portion, and advancing a third hopper portion forwardly relative to said fixed first hopper portion into said pile of particulate material and filling said third hopper portion with particulate material.

* * * * *